Jan. 24, 1956 J. SPANOS 2,731,704

METHOD OF MAKING TRANSISTORS

Filed Dec. 27, 1952

INVENTOR
JOHN SPANOS
BY Elmer J. Gorn
ATTORNEY

United States Patent Office 2,731,704

Patented Jan. 24, 1956

2,731,704

METHOD OF MAKING TRANSISTORS

John Spanos, Billerica, Mass., assignor to Raytheon Manufacturing Company, Newton, Mass., a corporation of Delaware Application December 27, 1952, Serial No. 328,175

5 Claims. (Cl. 29—25.3)

This invention relates to a method of making transistors by fusing indium to a semiconductor member and to the treatment of indium for such transistors.

In the process of making transistors, it has become increasingly apparent that impurities forming or depositing on the transistor components have a great effect on the electrical characteristics of the finished transistor. This invention involves a novel method for cleaning an indium body that is to be used in a transistor which comprises washing the body with nitric acid, rinsing the body with pure water to remove the nitrates formed, and drying or storing the body in a suitable alcohol, such as methanol. Other common acids fail to give the good results obtained from treating indium with nitric acid. If the indium to be used is not cleaned, fusing and wetting processes become quite difficult. However, indium bodies which have been properly prepared are easily fused to semiconductor materials, such as germanium, and leads also may be readily soldered to indium, which has been cleaned, to complete the transistor. It should be understood that, where the term "transistor" is used in the specifications and claims, the term is not limited to the more complex transistors, such as the p-n-p type, but includes the semiconductor diodes, for example, the p-n type, as well.

Figure 1:
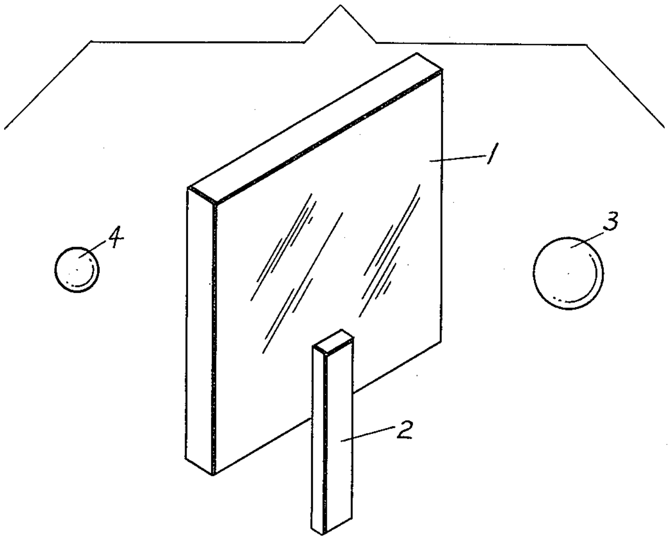
Figure 2:
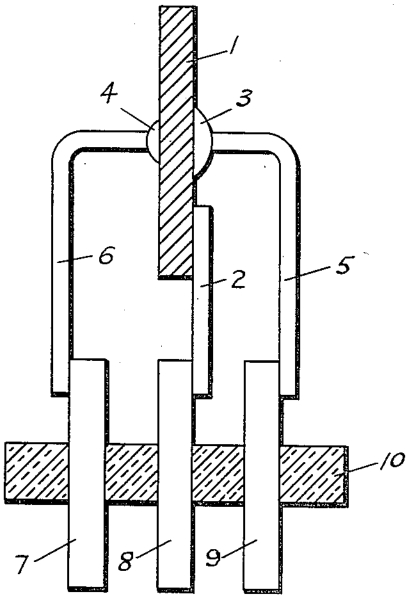

This invention and the features thereof will be understood more clearly and fully from the following detailed description of one embodiment of the invention with reference to the accompanying drawing, in which:

Fig. 1 is a greatly enlarged view of an n-type semiconductor member with a lead attached thereto and two indium bodies; and Fig. 2 is a greatly enlarged view of the assembled transistor components.

Referring now to Fig. 1, an n-type semiconductor member 1 having a lead 2 connected thereto is to be alloyed with two indium bodies 3 and 4. The n-type semiconductor member 1 may be any shape suitable for the purposes of this invention; however, a square-shaped slice of single-crystal germanium containing a trace of antimony has been used successfully. Also the semiconductor material need not be germanium, but can be any single-crystal semiconductor material to which indium may be fused. Likewise, the trace of n-type impurity can be any element selected from the fifth periodic group. The lead 2 may be any conducting material, such as nickel, and the bodies 3 and 4, although composed of indium, may be any suitable shape. Spherical bodies of indium, for example, were fused to germanium for this purpose. In making a p-n-p type transistor, certain desirable electrical characteristics may be obtained by making the indium body 3 relatively larger than the indium body 4, as shown in Fig. 1. Thus indium, which is a p-type impurity element selected from the third periodic group, when fused to opposite faces of the semiconductor member 1, will alloy to form p-type junctions.

Indium is quite active chemically. Therefore an oxide coating readily forms on the surfaces of the bodies 3 and 4 and must be removed before indium can be fused to the semiconductor member 1. Unless measures of this nature are taken, alloying and wetting techniques become difficult, if not impossible. Likewise, more complex surface films may be deposited on the bodies 3 and 4 if they are exposed to normal room conditions, and these films also must be removed. It has been experimentally determined that washing the indium bodies 3 and 4 with a dilute solution of nitric acid, such as a one-normal solution, and twice rinsing the bodies with pure water, such as triple distilled water, will remove the surface impurities. The surface oxides and films are decomposed and form soluble nitrates which readily go into solution when the surfaces of the bodies 3 and 4 are rinsed with pure water. It should be noted that indium will react with water after a short period of time. Thus the bodies 3 and 4 should be dried with a suitable anhydrous medium which will not react chemically with indium. Anhydrous alcohols, preferably methanol, may be used for this purpose, and if the indium bodies 3 and 4 are not to be used immediately, they should be stored in such an anhydrous medium as well. The bright silvery luster of pure indium is an indication that the cleaning process, as explained above, has been successful, and the process should be continued until such a luster is obtained.

In evaluating the present invention, other common acids, such as sulphuric acid and hydrochloric acid, were also used in an attempt to clean indium, but nitric acid was found to be far more effective in removing surface films from indium bodies than were the others. This is true even though the other acids form indium compounds which are also soluble in water. The reasons for the marked superiority of nitric acid over the other acids may lie in complex surface chemistry involving other impurities which may form on the surfaces of the bodies 3 and 4 in addition to the oxide coatings.

Referring now to Fig. 2, the indium bodies 3 and 4 are fused to the semiconductor member 1 and the leads 5 and 6 are soldered into the bodies 3 and 4. When nickel wires are used for the leads 5 and 6, indium, which is prepared as described above, is found to wet the wires and adhere thereto in a very satisfactory manner. After the leads 5 and 6 are attached to the bodies 3 and 4, the leads 6, 2 and 5 are connected to the socket leads 7, 8 and 9, respectively. The socket leads 7, 8 and 9 are mounted in a base 10 made of insulator material, such as glass. Thus the essential components for a p-n-p type transistor are connected as shown and are ready for final packaging.

It should be understood that this invention is not limited to the particular details described above, as many equivalents will suggest themselves to those skilled in the art. For example, the concentration of the dilute solution of nitric acid used in cleaning the indium bodies 3 and 4 need not be limited to a one-normal solution. Other dilute solutions of the acid may be used provided the concentration is not great enough to produce an excessive removal of indium. Also the water used to wash the nitrates from the surface of these bodies need not be triple distilled, since other well-known methods of purification may be used. Likewise, the indium bodies 3 and 4 could be used to form junction diodes of the p-n type, as well as the more complex p-n-p type transistor described above. Therefore, it is desired that the appended claims be given a broad interpretation commensurate with the scope of the invention within the art.

What is claimed is:

1. The method of making a transistor which includes the steps of forming a body of indium, washing said body in a dilute solution of nitric acid, rinsing said body in pure water, drying said body, and fusing said body to an n-type semiconductor member.

2. The method of making a transistor which includes the steps of forming a body of indium, washing said body in a dilute solution of nitric acid, rinsing said body in pure water, drying said body, fusing said body to an n-type semiconductor member, and connecting leads to said member and said body.

3. The method of making a transistor which includes the steps of forming a body of indium, washing said body in a one-normal solution of nitric acid, rinsing said body in pure water, drying said body, and fusing said body to an n-type semi-conductor member.

4. The method of making a transistor which includes the steps of forming a body of indium, washing said body in a dilute solution of nitric acid, rinsing said body in pure water, drying said body with methanol, and fusing said body to an n-type semiconductor member.

5. The method of making a transistor which includes the steps of forming a body of indium, washing said body in a dilute solution of nitric acid, rinsing said body in pure water, drying said body with an anhydrous alcohol, and fusing said body to an n-type semiconductor member.

References Cited in the file of this patent

UNITED STATES PATENTS 2,644,852 Dunlap ------------------ July 7, 1953